United States Patent [19]

Boggio et al.

[11] 4,279,395
[45] Jul. 21, 1981

[54] SPEED CONTROL APPARATUS FOR RAILROAD TRAINS

[75] Inventors: Francesco Boggio; Andrea Bertone; Enzo Tumolo, all of Turin, Italy

[73] Assignee: WABCO Westinghouse Compagnia Italiana Segnali S.p.A., Turin, Italy

[21] Appl. No.: 92,111

[22] Filed: Nov. 7, 1979

[30] Foreign Application Priority Data

Dec. 21, 1978 [IT] Italy .............................. 69919 A/78

[51] Int. Cl.³ .............................................. B61L 3/00
[52] U.S. Cl. ............................ 246/182 R; 246/187 B; 246/187 C
[58] Field of Search ........... 246/182 B, 182 C, 182 R, 246/182 AA, 182 AB, 182 BH, 187 B, 187 C, 5; 318/564; 361/236, 242; 364/426; 371/68

[56] References Cited

U.S. PATENT DOCUMENTS

| | | | |
|---|---|---|---|
| 2,841,745 | 7/1958 | Shields | 246/182 R |
| 3,639,754 | 2/1972 | Kovalcik et al. | 364/426 X |
| 3,946,973 | 3/1976 | Budway et al. | 246/182 BH |
| 4,015,804 | 4/1977 | Dobler et al. | 246/5 |

Primary Examiner—J. D. Miller
Assistant Examiner—Reinhard J. Eisenzopf
Attorney, Agent, or Firm—A. G. Williamson, Jr.

[57] ABSTRACT

A pair of on-board processing units, operating in parallel, are supplied with input signals representing actual train speed, advance traffic conditions, and selected train parameters. Each unit continuously calculates a maximum train speed from which emergency braking will stop the train within the indicated clear track distance ahead. Each unit also compares the calculated maximum speed with actual train speed and emits a preselected distinctive frequency signal or a d.c. signal as actual speed is less than, or equals, or exceeds maximum speed, respectively. A logic network with parallel filter-rectifier circuit paths passes the unit outputs, if of the preselected frequencies, to a two-input AND gate whose output holds emergency braking released. If a preselected frequency output is absent from either or both units, due to actual speed equaling or exceeding maximum speed or to a fault condition in the apparatus, the corresponding lack of an AND gate output actuates emergency braking. Each processing unit monitors operation of the other unit so that, if a malfunction is detected, the operable unit, when input speed signals are within limits, also emits a second signal of the other unit frequency. This is passed through a separate filter rectifier circuit within the logic network and applied to the second input of the AND gate to maintain train movement.

8 Claims, 1 Drawing Figure

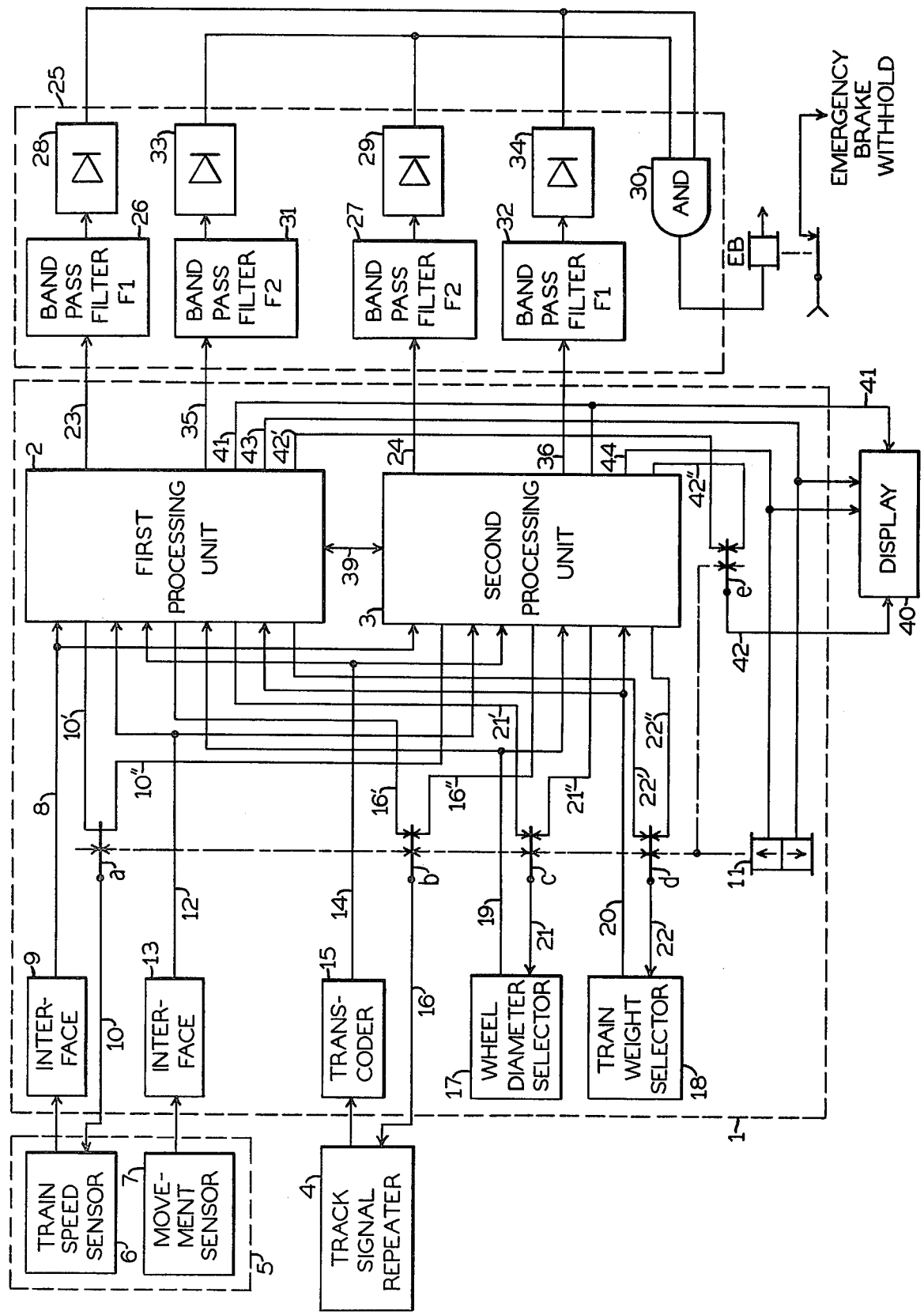

SPEED CONTROL APPARATUS FOR RAILROAD TRAINS

BACKGROUND OF THE INVENTION

Our invention relates to speed control apparatus for railroad trains. More particularly, the invention pertains to a velocity control arrangement on board a railroad train or locomotive which calculates a maximum allowable speed in accordance with a stopping distance based on the advance traffic condition signal received from the wayside signal system and controls the train speed so as not to exceed this calculated maximum speed.

Speed control systems for railroad trains exist in several forms. However, in the known arrangements, a maximum permitted speed is arbitrarily assigned for each different cab signal aspect or indication received from the wayside signal system. Each such cab signal indication designates a different traffic condition along the track in advance of the moving train or, in effect, each indication designates a point in advance at which the train must be prepared to stop. Since the permitted speed level is preset in accordance with the cab signal aspects, the same level must always be enforced when the corresponding cab signal indication is displayed. This somewhat limits the most effective operation of the train since variations in the track parameters through the advanced stretch, e.g., ascending or descending grade curvature, make stopping distances from the same speed vary. Also, various train parameters have an effect on the stopping distance. If traffic conditions, track characteristics, and individual train parameters can all be incorporated into the maximum speed allowed for each signal indication, a more efficient operation of the train may be achieved. This process requires the continuous calculation of a maximum train speed, from which the train's braking capabilities stop the train within the indicated clear track, and comparing that allowable speed with the existing speed to inhibit an overspeed situation. Such calculations and comparisons require the on-board processing of all existing information, that is, cab signal indication, existing train speed, advance traffic and track conditions, train parameters, etc. However, with the present availability of small size data processors, it is possible to use such devices on board the train or locomotive to accomplish the determination of the maximum speed allowable at each instant in accordance with all the listed factors. Such speed calculations and maintenance of that speed restriction provide a distinct advantage in train operation.

Accordingly, an object of our invention is speed control apparatus for railroad trains which calculates a maximum allowable speed in accordance with the stopping distance indicated by a received cab signal indication with due consideration of known train and track parameters.

Another object of the invention is a data processing arrangement for controlling the speed of a railroad train in accordance with a maximum speed determined from the received wayside signal indication, the advance track and train parameters, and the current or existing train speed.

A still further object of the invention is a processing means for use on a railroad train which calculates a maximum allowed train speed at which the available braking capability will stop the train within the unoccupied distance indicated by the received wayside signal, compares the maximum speed signal thus calculated with the existing train speed signal received from speed sensing means, and provides a permissive operating signal while the existing speed is less than the calculated maximum speed.

Yet another object of the invention is speed control apparatus for a railroad train in which each of a pair of processing devices calculates a maximum speed from which train braking is capable of stopping the train within the clear track distance in advance indicated by the advance traffic condition signal received from the wayside, each processing device further comparing the calculated speed with the current train speed received from sensing elements on board the train and outputting a selected signal into a logic network as the train speed is less than, or equal to, or greater than, the maximum calculated speed, the logic network processing the output signals to hold off the train braking only when the signal received from each processing device indicates that the maximum speed is not exceeded.

Also an object of our invention is speed control apparatus for a railroad train including a pair of processing units, each coupled to receive a signal representing the current train speed, a signal indicating advance traffic conditions, and signals representing specific parameters of the train, and functioning to determine a critical speed from which the train brakes can stop the train within the available clear distance designated by the received advance traffic signal and to compare this critical speed with the current speed to develop an output signal of predetermined characteristics only when the current speed is less than the critical speed; and a logic network for receiving the processing unit output signals and controlling train brakes to stop the train if each output signal does not have the individual predetermined characteristic.

Other objects, features, and advantages of our invention will become apparent from the following specification and appended claims when taken in connection with the accompanying drawing.

SUMMARY OF THE INVENTION

According to the invention, a pair of processing units are provided on board the railroad train or locomotive. Each unit is supplied with signals representing train movement, the actual or current train speed, and advance traffic conditions, this last signal being received from the wayside signal system. In addition, each unit processor is supplied with signals representing variable train parameters, specifically shown as being wheel diameter and train weight, each selected manually in accordance with the known conditions of the train. It may be noted that other pertinent parameters, either of the train or of advance traffic and track conditions, may also be included in the data processing. Each processor unit continuously calculates, from the inputs regarding the parameters and wayside conditions, a critical or maximum value of train speed from which emergency braking of the train will stop the train before it arrives at the first stop signal in advance, which normally is the location of the next preceding train. Each processing unit also compares this calculated critical speed with the current train speed, as received from speed sensing means, and generates an alternating current output of a distinctive frequency (different from the other unit) as long as the actual train speed is less than the calculated maximum allowable speed. This output signal becomes a continuous signal when the train speed equals or exceeds the calculated value.

The output of each processing unit is applied to an input of a logic network and passed through a separate band pass filter center-tuned to the corresponding frequency. The output of each filter is rectified for application to one input of a two-input logic AND element. The output of this AND gate, present only when both processing unit output signals have been passed through the logic network and applied to the gate inputs, holds the emergency brake for the train released. Absence of either input to the AND gate, which condition occurs if either (or both) processing unit output is of a continuous characteristic or of an improper frequency, inhibits any output from the AND gate so that emergency braking is actuated to stop the train, within the known clear distance in advance along the track.

The pair of processing units are cross-connected so that each may check the continued and correct operation of the other unit. If a failure within one unit occurs, the second unit then generates a second output signal having the frequency of the failed unit, to simulate its operation, providing that the input signals and comparison of speeds remain within the predetermined proper limits. The second output from the still operating unit is then applied through a second associated band pass filter and rectifier circuit path, tuned to the other unit frequency, and thence to the opposite, i.e., other unit, input of the AND gate to retain control of the emergency braking. Also, if any failure of the input signal arrangement occurs, that is, a signal is absent due to an apparatus fault, the processing unit outputs become continuous or are inhibited so that emergency braking is actuated in a fail-safe manner.

DESCRIPTION OF THE ILLUSTRATED EMBODIMENT

Prior to defining the novelty of the invention in the appended claims, we will describe, in more specific detail, an arrangement of speed control apparatus embodying the invention as illustrated in the accompanying drawing, which is a schematic block diagram showing a preferred form of the speed control apparatus embodying the invention. Since most of the operational elements which comprise the arrangement shown in the drawing are of known design and various selections are available, these elements are illustrated by conventional blocks labeled to define the function performed. The lines coupling these blocks then represent, generally, signal or function flow channels and not specific electrical connections.

In the drawing, a switching means 11 is arbitrarily shown in a manner to illustrate the operation intended rather than a specific device. Each of the five circuit switches a through e is illustrated as comprising an armature movable in either direction, as designated by the arrows at the center, and an upper and a lower contact. In the at-rest condition, both contacts are closed against the armature with the corresponding circuits complete through the armature to the single ongoing lead. When an armature moves up, the lower contact opens and the corresponding circuit is interrupted. Conversely, when an armature moves downward, the upper contact opens and its circuit is interrupted. An example is a manually operated pushbutton-type circuit contactor with normally closed contacts opened when the pushbutton is pushed or pulled. However, to illustrate automatic control of the switching devices, as will be discussed later, the armatures are shown as controlled by a relay or solenoid with two windings as designated by the symbol 11 in the lower left of the drawing. When the upper winding is activated by an external source, it moves the armatures upward as designated by the upward-pointing arrow within the winding symbol and the lower contacts and corresponding circuits are opened. In a similar fashion, when a lower winding is activated, the armatures move downward in accordance with the downward-pointing arrow symbol and the upper contacts and corresponding circuits are opened. Thus, the external control of the windings results in automatic operation of the switch, as opposed to manual operation, so that the switching armatures are simultaneously moved upward or downward in accordance with the activated winding of the operating element.

Referring again to the drawing, the dashed line block, reference 1, designates a processor means which is part of on-board apparatus for controlling the speed of a railroad locomotive or train. The processor means 1 includes first and second processing units illustrated by the conventional blocks 2 and 3. The conventional track signal repeater block 4 represents cab signal apparatus of any known type for repeating wayside signals on board the train. This unit may also be used to provide signals, separately or combined with the traffic indication, representing advance track parameters, which are stored in a memory element and read out in accordance with the location of the train as it moves along the stretch of track.

Within the dashed block 5 is apparatus for sensing the locomotive or train velocity, including a speed sensor device 6 and a movement sensor 7 capable of detecting the train's movement. The speed sensor 6 may consist of an electromagnetic pickup coupled with a toothed wheel mounted on an axle of the locomotive or, for another example, may consist of an electronic optical generator. Speed sensor 6 is connected by a connection line 8 with the first and second processing units 2 and 3. Inserted in this connection is an interface circuit means 9 for transcoding signals from speed sensor 6 into a form suitable for use by the processing units. The two processing units are also connected with velocity sensor 6, for return and control of the signals being sensed, by connection lines 10, 10', and 10'', which are at times switched by contact a of the switching device 11 previously described. Movement sensor 7 is also connected with the two processing units by channel line 12 which incorporates an interface circuit 13 for transcoding the signals from sensor 7. Connection line 14 with transcoder element 15 couples the track signal repeater 4 with processing units 2 and 3 while return lines 16, 16', and 16'', connected through contact b of the switching device, provide a return circuit from the processor units to the cab signal or track signal repeater element 4.

Processor 1 also includes a selector device 17 for setting the value of the diameter of the locomotive or train wheels. For example, this device may consist of two manual selectors, a first selector with several positions for setting or selecting various nominal diameter values and a second selector for setting one of various tolerance classes. Because of selector 17, processor 1 can therefore be adapted to various types of trains or locomotives with different wheel diameter values. Processor 1 further includes a selector 18 for setting the train weight value. Selectors 17 and 18 are connected by connection lines 19 and 20, respectively, with the two processing units 2 and 3. These two selectors are also connected with these units by return lines 21, 21', 21" and 22, 22', 22" and switching device contacts c and d, respectively, in a manner apparent from an observation of the drawing figure.

The processing units 2 and 3 are arranged to operate in parallel. Each of these units is intended to continuously calculate, on the basis of the signals received from sensors 6 and 7, signal repeater 4, and selectors 17 and 18, a critical value of train speed corresponding to a maximum value at which emergency braking will stop the train before it passes the first wayside signal which is at stop along the track in advance. Each processing unit then compares the actual value of the train speed with this calculated critical speed value. Each of the processing units 2 and 3 is designed to emit, at output connections indicated by the numerals 23 and 24, respectively, as a result of the comparison of actual and calculated speeds, signals with different characteristics. When the train speed is less than the critical velocity value, each processing unit emits at its output an alternating current signal with a specific and distinctive frequency, e.g., F1 and F2 for units 2 and 3, respectively. In the event the train speed is equal to or greater than the critical speed value, each processing unit emits a continuous, i.e., direct current, signal.

The arrangement also includes a logic processing network, enclosed by the dashed block 25, for controlling the actuation of the emergency braking system. This logic network includes two band pass filters conventionally shown by blocks 26 and 27 connected in series with outputs of processing units 2 and 3, respectively, by connection lines 23 and 24. Each filter is center-tuned to pass solely the corresponding alternating current signal of the distinctive frequency F1 or F2 assigned to the associated processing unit. Thus, if one of the two processing units outputs a continuous signal, that is, direct current, because the critical speed value has been exceeded, or outputs an alternating current signal having a frequency different from the assigned frequency (for example, because of malfunctioning of the unit), the corresponding filter does not emit any signal at its output. Network 25 also includes two rectifier elements 28 and 29, shown conventionally, arranged in series with the band pass filters 26 and 27, respectively, and a logic AND gate 30, having a different one of its two inputs connected with the outputs of each rectifier 28 and 29. The output of AND gate 30 controls the actuation of the train's emergency braking system. For example, this may be accomplished by an emergency brake relay EB which is normally held energized by the output of the AND gate and holds its illustrated contact closed to withhold the application of emergency braking. When relay EB is de-energized and releases to open its contact, emergency braking is actuated to stop the train.

Logic network 25 further includes two additional band pass filters 31 and 32, turned to frequencies F2 and F1, respectively, and two rectifier elements 33 and 34 which are connected in series, in the manner illustrated, with other outputs of processing units 2 and 3 by additional connection lines 35 and 36, respectively. The outputs of rectifiers 33 and 34 are connected to the inputs of AND gate 30 in a reverse manner to that of the associated rectifiers 28 and 29, respectively. Said in another way, the output of rectifiers 28 and 34 are connected to the lower input of AND gate 30 while outputs of rectifiers 29 and 33 are connected in parallel to the upper input of AND gate 30.

Each of the two processing units 2 and 3 is capable of simulating the alternating current signal normally emitted by the other processing unit, in event the other unit malfunctions. These simulation signals are transmitted over connections 35 and 36, respectively. Thus, filters 31 and 32 are tuned respectively to frequencies F2 and F1, which in each case is the normal output frequency of the other processing unit. The arrangement is also provided with control means for periodic monitoring, through exchange line 39, the coincidence of the results of the operations carried out by the two processing units and means for applying a corresponding signal from the two units to a display element, block 40, by connections 41. In the event one of the processing units malfunctions, this unit can be excluded automatically through operation of switching device 11. For example, if the second processing unit malfunctions, an output occurs on connection 44 which activates the upper winding of device 11 so that the various armatures are moved to the upward position, interrupting the return lines over their lower contacts. In other words, the return connections from the failed second processing unit to speed sensor 6, track signal repeater 4, and selectors 17 and 18 would be interrupted. Display element 40 is also connected with both processing units over connection lines 42' and 42" through switch contactor e and line 42, in order to receive the results of the operations of the two processing units. In the previous example, if the second unit has failed, the operation of switch arm e of device 11 will interrupt the connection between lines 42" and 42 so that no processing information is transmitted to the display unit from the second processing unit. However, connections from lines 43 and 44 to display unit 40 will register the failure of either processing unit.

Display unit 40 is preferably also provided with indications of the preselected wheel diameter, the preselected train weight value, the difference between the calculated critical speed and the actual speed of the train, and an overspeed indication when the critical speed value is exceeded. Further, both of the processing units 2 and 3 and band pass filters 26, 27, 31, and 32 as well as the interface circuits 9 and 13 are of the fail-safe or vital design. In other words, the detection of any malfunctioning in one of these elements immediately actuates the emergency braking system.

Describing the operation of the arrangement, during the movement of the railroad train, track signal repeater 4 provides information as to advanced traffic and/or track conditions to both processing units 2 and 3. These units also receive continuous information relative to the actual train speed from sensors 6 and 7 and information relative to selected wheel diameter and train weight values from selectors 17 and 18. Each of the two processing units separately processes the received data to calculate, instant by instant, the critical (maximum) speed value and compares it with the actual speed of the train. As long as the train's actual speed is less than the critical value, both the processing units emit, over their output connection lines 23 and 24, alternating current signals, each with a distinctive and preselected frequency, i.e., F1 and F2. The signals pass through the associated band pass filters 26 and 27, each of which is center-tuned exactly on the corresponding frequency, and through the associated rectifier elements 28 and 29 to ultimately reach logic AND gate 30. With both inputs active, AND gate 30 emits an output signal that holds relay EB energized and thus the emergency brake withheld or disengaged. When either of the processing units emits at its output a continuous or direct current signal, due to the train exceeding the critical speed value, or an alternating current signal with a frequency different than its preselected frequency due to malfunctioning, the corresponding band pass filter blocks the passage of this signal. In this case, AND gate 30 does not receive both inputs and thus emits no output signal. Relay EB then releases and emergency braking is actuated. If, however, as a result of the mutual control operations and cross monitoring between the two processing units, one of these units is excluded because of a detected malfunction, the alternating current signal normally emitted by the excluded unit is simulated by the other processing unit so that once again the AND gate 30 receives two inputs and holds relay EB energized. This withholds the application of the emergency braking and allows the train to continue its forward movement. An indication of the malfunction is displayed by unit 40 so that corrective action may be taken.

The arrangement of the invention thus provides an effective speed control apparatus for railroad trains which instantaneously and continuously calculates, from train parameters and indicated clear distance in advance, a critical maximum speed from which braking will stop the train within the clear distance. The calculated maximum speed is continuously compared with the existing speed and braking controlled accordingly as an under or overspeed condition is detected. Use of a dual channel processor provides a redundant check of correct calculation and comparison of maximum speed while the use of vital circuit elements within the apparatus combination gives fail-safe operation. However, internal monitoring of the operation of the dual processing units allows one unit to simulate operation of both units if a malfunction occurs within the processor to permit train operation to continue. Since the use of solid-state integrated circuit elements is expected and preferred, an efficient and economical arrangement results.

Although we have shown and described but one arrangement of speed control apparatus for railroad trains, it is to be understood that changes and modifications within the scope of the appended claims are within the scope of the invention.

Having now described the invention, what we claim as new and desire to secure by Letters Patent, is:

1. Speed control apparatus for a railroad train, which is provided with brake control means, track signal repeater means for indicating advance traffic conditions along the stretch of track over which the train moves, and means for measuring actual train speed, comprising in combination,
   (a) a first and a second processing unit, each coupled for receiving advance traffic condition and actual train speed signals and responsive thereto for individually calculating a maximum train speed which permits stopping said train by train braking controlled by said brake control means within the unoccupied track distance indicated by the received advance traffic condition signal,
   (b) each processing unit further responsive for comparing the calculated speed signal with the received actual speed signal and for producing an alternating current output signal, having a preselected frequency different from that of the other processing unit, only when said actual train speed is less than the corresponding calculated maximum speed, each unit otherwise producing a signal having a direct current characteristic,
   (c) a first and a second band pass filter and rectifier circuit path coupled to said first and second processing units, respectively, each circuit path tuned for producing an output signal only when the associated processing unit output is of the proper preselected distinctive frequency, and
   (d) a two-input AND logic gate with one input coupled to receive the output signal from one filter and rectifier circuit path, the other input coupled to receive the output from the other filter and rectifier circuit path, and an output coupled to said brake control means for withholding or actuating train braking as an AND gate output signal is produced or is absent, respectively.

2. Speed control apparatus as defined in claim 1, which further includes,
   (a) a selector means coupled to both said processing units and operable for supplying thereto a signal representing a selected value of train parameters effecting train operation,
   (b) each processing unit responsive to the reception of the parameter value signal for modifying the calculation of said maximum speed and comparison of actual and maximum speeds to incorporate the effect of said parameters on speed measuring and train braking.

3. Speed control apparatus, as defined in claim 2, in which,
   (a) said first and second processing units are cross coupled for monitoring the operation of the other unit,
   (b) each unit is responsive to the detection of a malfunction in the other unit for generating a second output simulating the output of said other unit when the actual train speed is less than the calculated maximum speed,
   and which further includes,
   (c) a third and a fourth band pass filter and rectifier circuit path coupled to the second output of said first and second processing units, respectively, and also coupled to said AND gate inputs in parallel with said second and first circuit paths, respectively, and
   (d) each third and fourth circuit path tuned for producing an output signal only when the associated processing unit second output is simulating the preselected frequency output of the other processing unit.

4. Speed control apparatus, as defined in claim 3, in which said selector means includes,
   (a) a wheel diameter selector coupled to both processing units and operable to a selected position for supplying a signal representing a predetermined existing diameter of the train wheels effecting train braking distance and speed measurement, and
   (b) a train weight selector also coupled to both processing units and operable to a selected position for supplying a signal representing the train weight effecting train braking distance.

5. Speed control apparatus as defined in claim 4 in which,
   said brake control means controls an emergency brake application to stop said train within the indicated advance unoccupied track distance when an AND gate output signal is absent.

6. Apparatus for controlling the speed of a railroad train, which is equipped with braking control means, advance traffic condition signal receiving means, actual train speed measuring means, and train parameter selecting means, comprising in combination,
   (a) a first and a second processing unit, each coupled to said advance traffic condition signal receiving means and said train parameter selecting means and responsive to input signals received therefrom for individually calculating a critical speed representing the maximum speed from which train braking is capable of stopping said train within the unoccupied track distance indicated by the received advance traffic condition signal,
   (b) each processing unit also coupled for comparing the calculated critical speed with the received actual speed signal, and producing an alternating current output signal having a preselected frequency, different from that of the signal produced by the other unit, only when the measured speed is less than said critical speed and a direct current signal when said measured speed is equal to or greater than said critical speed,
   (c) a first and a second band pass filter connected in series with said first and second processing units, respectively, each filter tuned to pass only the preselected frequency signal produced by the associated processing unit,
   (d) a pair of rectifiers, one coupled in series with each filter, and
   (e) a two-input AND gate with one input coupled to receive an output signal from one rectifier, the other input coupled to receive an output signal from the second rectifier, and an output coupled to said braking control means for withholding a train brake application only when a gate output signal is present, said braking control means otherwise actuating a brake application to stop the train within the indicated unoccupied track distance.

7. Apparatus for controlling train speed as defined in claim 6, in which,
   (a) said first and second processing units are cross coupled for monitoring the operation of the other unit,
   (b) each unit is responsive to the detection of a malfunction in the other unit for producing a second output signal simulating the output signal of said other unit when the measured speed is less than the calculated critical speed,
and which further includes,
   (c) a third and a fourth band pass filter connected to the second output of said first and second processing units, respectively, each tuned to pass only the preselected frequency of the other processing unit, and
   (d) another pair of rectifiers, one coupled in series between each of said third and fourth filters and the output of the rectifier coupled with said second and first filters, respectively, to said AND gate inputs.

8. Apparatus for controlling train speed as defined in claims 6 or 7 in which, said braking control means controls emergency braking applications for stopping said train within the indicated advance unoccupied track distance when an AND gate output signal is absent.

* * * * *